(12) United States Patent
He et al.

(10) Patent No.: US 11,095,378 B2
(45) Date of Patent: Aug. 17, 2021

(54) WIRELESS CHANNEL MONITORING AND SIMULATION DEVICE WITH MULTI-INPUT MULTI-OUTPUT

(71) Applicant: WUHAN UNIVERSITY, Hubei (CN)

(72) Inventors: Yigang He, Hubei (CN); Luqiang Shi, Hubei (CN); Guolong Shi, Hubei (CN); Shuiqing Xu, Hubei (CN); Liulu He, Hubei (CN); Yuting Wu, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 17/082,048

(22) Filed: Oct. 28, 2020

(65) Prior Publication Data

US 2021/0175986 A1 Jun. 10, 2021

(30) Foreign Application Priority Data

Dec. 6, 2019 (CN) .......................... 201911240972.7

(51) Int. Cl.
*H04B 17/391* (2015.01)
*H04B 7/0413* (2017.01)
*H04B 17/00* (2015.01)

(52) U.S. Cl.
CPC ....... *H04B 17/3912* (2015.01); *H04B 7/0413* (2013.01); *H04B 17/0087* (2013.01)

(58) Field of Classification Search
CPC ............ H04B 17/3912; H04B 17/0087; H04B 7/0413; H04W 24/00; H04L 41/145
See application file for complete search history.

(56) References Cited

U.S. PATENT DOCUMENTS

| 10,778,291 | B1* | 9/2020 | Wang | ........................ | H04B 7/0413 |
| 2017/0013486 | A1* | 1/2017 | Beyme | ................. | H04W 72/085 |
| 2018/0192306 | A1* | 7/2018 | Wang | ...................... | H04B 17/26 |

(Continued)

OTHER PUBLICATIONS

Nada Bel-haj-maati; Nadine Malhouroux; Patrice Pajusco; Michel Ney, "Massive MIMO Channel Measurements and Simulations at 3.7 GHz in Outdoor Environment", 2019 IEEE, 2019, published in 23rd International Conference on Applied Electromagnetics and Communications (ICECOM). (Year: 2019).*

*Primary Examiner* — Khanh C Tran
(74) *Attorney, Agent, or Firm* — JCIPRNET

(57) ABSTRACT

A wireless channel monitoring and simulation device with multi-input multi-output (MIMO) is provided, which includes: a wireless channel monitor, configured to collect characteristic parameters of wireless channels in typical environments, and establish models based on the characteristic parameters; a model database, configured to store the characteristic parameter models and parameterize; an original signal, configured to input N different original signals; a wireless channel simulator, configured to simulate a typical channel environment according to the model database configuration, so that the original signal is the same as that in a real typical channel environment, and adopts a N-path output; an N-channel oscilloscope, configured to observe specific waveforms of N-path simulated signals; and a master computer software, configured to process, analyze, and store N-path output signals. The disclosure has many input and output channels, many simulation channel paths, many observable signal changes, flexible design, and fast signal processing speed.

9 Claims, 5 Drawing Sheets

(56) References Cited

U.S. PATENT DOCUMENTS

| | | | |
|---|---|---|---|
| 2019/0103926 A1* | 4/2019 | Chen | H04W 24/06 |
| 2019/0274108 A1* | 9/2019 | O'Shea | H04L 5/0005 |
| 2019/0288780 A1* | 9/2019 | Rodriguez-Herrera | H04B 17/3911 |
| 2020/0213883 A1* | 7/2020 | Kong | H04B 17/0087 |
| 2020/0343985 A1* | 10/2020 | O'Shea | H04B 17/3911 |

* cited by examiner

WIRELESS CHANNEL MONITORING AND SIMULATION DEVICE WITH MULTI-INPUT MULTI-OUTPUT

CROSS-REFERENCE TO RELATED APPLICATION

This application claims the priority benefit of China application serial no. 201911240972.7, filed on Dec. 6, 2019. The entirety of the above-mentioned patent application is hereby incorporated by reference herein and made a part of this specification.

BACKGROUND

Technical Field

The disclosure relates to the technical fields of wireless communication and field programmable gate array (FPGA) development, and in particular to a wireless channel monitoring and simulation device with multi-input multi-output (MIMO).

Description of Related Art

During the research and development (R&D) process of wireless communication products, the wireless signal change situations in multiple typical channels need to be researched. However, the typical channels are not easy to build in a laboratory environment. Therefore, a wireless communication equipment is required to test in the actual environment, which increases the cost of testing and extends the R&D cycle. However, the characteristics of the wireless channels are very complex. The wireless channel has noise interference and various delay fading effects, such as the Rayleigh fading, Rician fading, Nakagami fading, log-normal fading, Suzuki fading, etc., on the original signal. If the influence of the wireless channel on the original signal can be accurately simulated in the laboratory, the R&D cycle can be effectively shortened and the R&D cost can be reduced.

In the wireless network channel simulation methods adopted by the prior art, single channel simulation is generally adopted, which cannot simulate multiple paths of multiple channels at the same time. Also, when processing the input signal, if there are signals of multiple paths, corresponding hardware units of multiple paths are generally required to process the signals separately. The expansion processing of the input signal is not performed, resulting in a waste of hardware resources. Excessive hardware also causes unstable operation of the equipment.

SUMMARY

The disclosure provides a wireless channel monitoring and simulation device with multi-input multi-output (MIMO), which has many input and output channels, expandable simulation channel path, many observable signal change situations, flexible design, and fast signal processing speed.

The technical solution adopted by the disclosure to solve the technical issues is as follows.

The disclosure provides a wireless channel monitoring and simulation device with multi-input multi-output, which includes a wireless channel monitor, a model database, an original signal, a wireless channel simulator, an N-channel oscilloscope, and a master computer software.

The wireless channel monitor is configured to collect characteristic parameters of wireless channels in multiple typical environments, establish models based on the characteristic parameters of the wireless channels in the typical environments, and store established characteristic parameter models in the model database.

The model database is configured to store the characteristic parameter models of the wireless channels in the typical environments and configure parameters of the wireless channel simulator.

The original signal is a signal to be simulated to pass through the wireless channel simulator and is a wireless radio frequency signal. N-path inputs are adopted, that is, N different original signals may be simultaneously inputted.

The wireless channel simulator is configured to receive the parameter configuration of the model database and receive the original signal. The wireless channel simulator configured by the model database simulates a typical channel environment for the original signal, so that the original signal is the same as that in a real typical channel environment. The wireless channel simulator adopts N-path outputs.

The N-channel oscilloscope is configured to observe specific waveforms of N-path simulated signals outputted by the wireless channel simulator, and transmit the N-path outputs to the master computer software.

The master computer software is configured to receive the N-path output from the wireless channel simulator, and process, analyze, and store N-path output signals.

Further, for the wireless channels in the multiple typical environments of the disclosure, the typical environments include, but are not limited to, a strong electromagnetic environment, a stormy environment, a plateau environment, and a high-speed railway operating environment.

Further, the wireless channel simulator of the disclosure includes a radio frequency signal receiving and quantization module, a signal strobe module, a channel simulation module, and a signal synthesis module.

The radio frequency signal receiving and quantization module is configured to receive an original radio frequency signal, perform down-conversion and analog-to-digital conversion processing on the original radio frequency signal, and transmit a processed digital signal to the signal strobe module.

The signal strobe module is configured to gate N-path signals processed by the radio frequency signal receiving and quantization module to 2N paths, and transmit 2N-path signals to the channel simulation module.

The channel simulation module is configured to receive the 2N-path signals transmitted by the signal strobe module, and perform channel simulation operation on the received signal of each path according to the configuration of the model database. The channel simulation module simulates at most 2N different channels and transmits processed signals to the signal synthesis module.

The signal synthesis module is configured to receive the 2N-path signals processed by the channel simulation module and superposition the received signals to simulate the situation of simultaneous appearance of multiple typical environments or superposition of multi-path signals in one environment. A superpositioned signal has N output channels.

Further, the signal synthesis module of the disclosure receives the 2N-path signals processed by the channel simulation module. If only one typical channel is simulated, there are $C_1^{2N}$ outputs. If the superposition of two channels is simulated, there are $C_2^{2N}$ outputs. Similarly, if the superposition of 2N channels is simulated, there are $C_{2N}^{2N}$ outputs. The output channel of each path outputs at most $C_1^{2N}+C_2^{2N}+\ldots+C_{2N}^{2N}$ original signal change situations.

Further, the radio frequency signal receiving and quantization module of the disclosure includes N signal receiving and quantization processing paths. Each path includes an antenna, a down-converter, and an analog-to-digital converter (ADC) module.

The antenna is configured to receive the original radio frequency signal.

The down-converter is configured to remove a carrier wave of the original radio frequency signal, so as to obtain an intermediate frequency signal.

The ADC module is configured to perform analog-to-digital conversion processing on the intermediate frequency signal, and convert the intermediate frequency signal into a digital baseband signal.

Further, the signal strobe module of the disclosure includes N 2×2 strobes, a 2N×2N strobe, and an MCU module.

The 2×2 strobe is configured to expand the 1-path digital baseband signal outputted by the radio frequency signal receiving and quantization module into two-path signals.

The 2N×2N strobe is configured to gate 2N outputs of the N 2×2 strobes to any one path in 2N-path outputs according to requirements.

The MCU module is configured to control the on and off of an internal switch of the 2N×2N strobe, thereby controlling the output of the 2N×2N strobe.

Further, the channel simulation module of the disclosure includes 2N field programmable gate array (FPGA) boards, which are respectively connected to the 2N-path outputs of the 2N'2N strobe. Parameters of each FPGA board are configured by the model database to simulate a wireless channel. The signal of each path is transmitted to the signal synthesis module after being processed by the corresponding FPGA board.

Further, the FPGA board of the channel simulation module of the disclosure includes a memory, a delay IP core, a fading IP core, a doppler IP core, and a noise IP core.

The memory is configured to store an input signal to adjust time delay.

The delay IP core simulates the delay effect of the wireless channel on the signal according to a channel delay parameter configured by the model database.

The fading IP core simulates the attenuation effect of the wireless channel on the signal according to a channel attenuation parameter configured by the model database.

The doppler IP core simulates the doppler frequency shift effect of the wireless channel on the signal according to a channel doppler frequency shift parameter configured by the model database.

The noise IP core simulates the noise effect of the wireless channel on the signal according to a channel noise parameter configured by the model database.

Further, in the N-path input signals of the disclosure, N is an integer multiple of 4.

BRIEF DESCRIPTION OF THE DRAWINGS

The disclosure will be further described below in conjunction with the accompanying drawings and embodiments.

DETAILED DESCRIPTION OF DISCLOSED EMBODIMENTS

The beneficial effects of the disclosure are: in the wireless channel monitoring and simulation device with MIMO of the disclosure: (1) The maximum MIMO of the disclosure is 4×4, the maximum number of simulation channel paths is 8, and the maximum number of output signal change situations is 255. According to requirements, 4-path input signals may be expanded to 8, 16, or even more paths. Therefore, the disclosure has the characteristics of many input and output channels, expandable simulation channel paths, and observable signal change situations. (2) The key component of the disclosure adopts the FPGA board, which has the characteristics of flexible design. Different channel fading types may be simulated according to different requirements. In other words, changing the fading IP core may simulate the Rayleigh fading, Rician fading, Nakagami fading, log-normal fading, Suzuki fading, etc. of the channel. (3) The hardware connection of the disclosure adopts a symmetrical design method, which has the characteristic of fast processing speed. 8-path signals may be simultaneously processed by adopting 8 FPGA boards, which reduces the time delay difference between the signal of each path and accelerates the speed of channel simulation.

In order for the objectives, technical solutions, and advantages of the disclosure to be clearer, the disclosure is further described in detail below with reference to the accompanying drawings and embodiments. It should be understood that the specific embodiments described here are only configured to explain the disclosure, but not to limit the disclosure.

Figure 1:
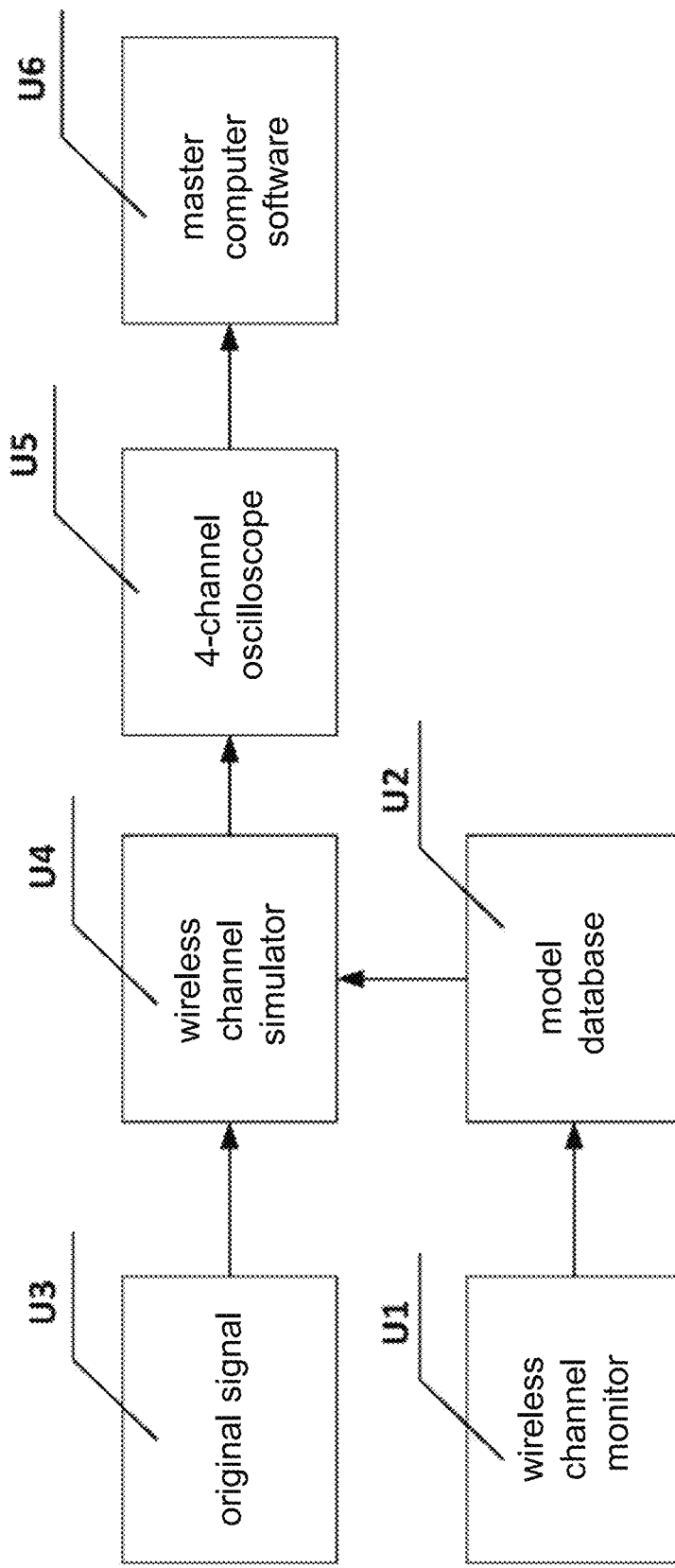
FIG. 1 is a schematic structural diagram of a wireless channel monitoring and simulation device with multi-input multi-output (MIMO) according to an embodiment of the disclosure.

As shown in FIG. 1, a wireless channel monitoring and simulation device with multi-input multi-output (MIMO) according to the embodiment of the disclosure includes a wireless channel monitor U1, a model database U2, an original signal U3, a wireless channel simulator U4, a 4-channel oscilloscope U5, and a master computer software U6.

The wireless channel monitor U1 is configured to collect characteristic parameters of wireless channels in multiple typical environments (such as a strong electromagnetic environment, a storm environment, a plateau environment, and a high-speed railway operating environment), establish models of the characteristic parameters of the wireless channels in the typical environments, and store established parameter models in the model database U2.

The model database U2 is configured to store the characteristic parameter models of the wireless channels in the typical environments and configure parameters of the wireless channel simulator U4.

The original signal U3 is a signal to be simulated that needs to pass through the wireless channel simulator U4 and is a wireless radio frequency signal. Not generally, the disclosure adopts 4-path inputs, that is, 4 different original signals may be simultaneously inputted.

The wireless channel simulator U4 accepts the parameter configuration of the model database U2 and receives the original signal U3. The wireless channel simulator U4 configured by the model database U2 may simulate a typical channel environment for the original signal U3, so that the original signal U3 is the same as that in a real typical channel environment. Not generally, the wireless channel simulator U4 adopts 4-path outputs.

The 4-channel oscilloscope U5 is configured to observe specific waveforms of 4-path simulated signals outputted by the wireless channel simulator U4 and transmit the 4-path outputs to the master computer software U6.

The master computer software U6 is configured to receive the 4-path outputs from the wireless channel simulator U4, and process, analyze, and store 4-path output signals.

Figure 2:
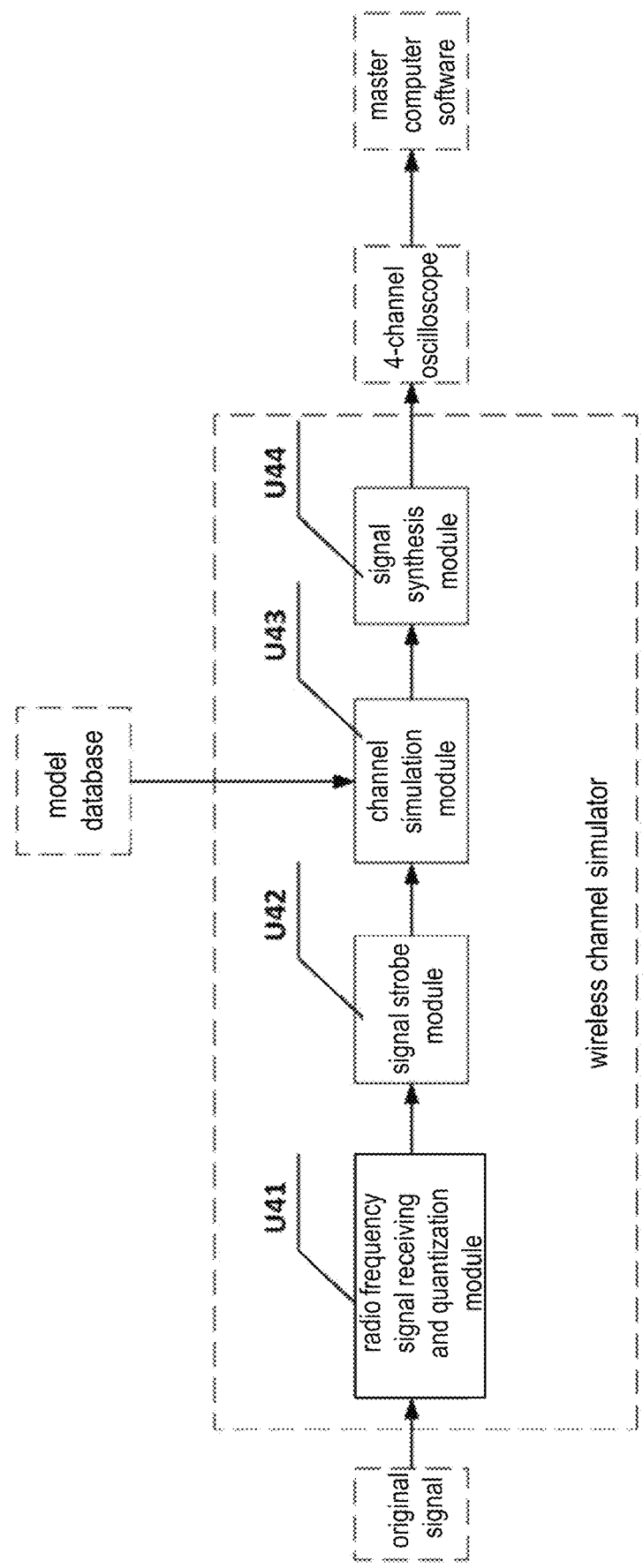
FIG. 2 is a functional block diagram of a wireless channel simulator of a wireless channel monitoring and simulation device with MIMO according to an embodiment of the disclosure.

As shown in FIG. 2, the wireless channel simulator U4 is divided by functions into a radio frequency signal receiving and quantization module U41, a signal strobe module U42, a channel simulation module U43, and a signal synthesis module U44.

The radio frequency signal receiving and quantization module U41 is configured to receive an original radio frequency signal, perform down-conversion and analog-to-digital conversion processing on the original radio frequency signal, and transmit a processed digital signal to the signal strobe module U42.

The signal strobe module U42 may gate up to 4-path digital signals processed by the radio frequency signal receiving and quantization module U41 to 8 paths and transmit the 8-path signals to the channel simulation module U43.

The channel simulation module U43 receives at most 8-path signals transmitted by the signal strobe module U42 and performs channel simulation operation on the received signal of each path according to the configuration of the model database U2. The channel simulation module U43 simulates at most 8 different channels and transmit the processed signals to the signal synthesis module U44.

The signal synthesis module U44 may receive up to 8-path signals processed by the channel simulation module U43 and performs Σ operation on the received signals. The signal synthesis module U44 has 4-path outputs. In other words, the signal synthesis module U44 may superposition the signals processed by the channel simulation module U43 to simulate original signal change situations when multiple typical environments appear simultaneously or directly output original signal change situations when one of the situations appear.

Assuming that the signal synthesis module U44 receives the 8-path signals processed by the channel simulation module U43, if only one typical channel is simulated, there are $C_1^8$ outputs. If the superposition of two channels is simulated, there are $C_2^8$ outputs. If the superposition of three channels is simulated, there are $C_3^8$ outputs. If the superposition of four channels is simulated, there are $C_4^8$ outputs. If the superposition of five channels is simulated, there are $C_5^8$ outputs. If the superposition of six channels is simulated, there are $C_6^8$ outputs. If the superposition of seven channels is simulated, there are $C_7^8$ outputs. If the superposition of eight channels is simulated, there are $C_8^8$ outputs.

The output of each path may output up to $C_1^8+C_2^8+C_3^8+C_4^8+C_5^8+C_6^8+C_7^8+C_8^8=255$ original signal change situations.

The signal synthesis module U44 may select 4 situations from the 255 original signal change situations each time, and transmit to the 4-channel oscilloscope U5 for observation through 4-path outputs.

Figure 3:
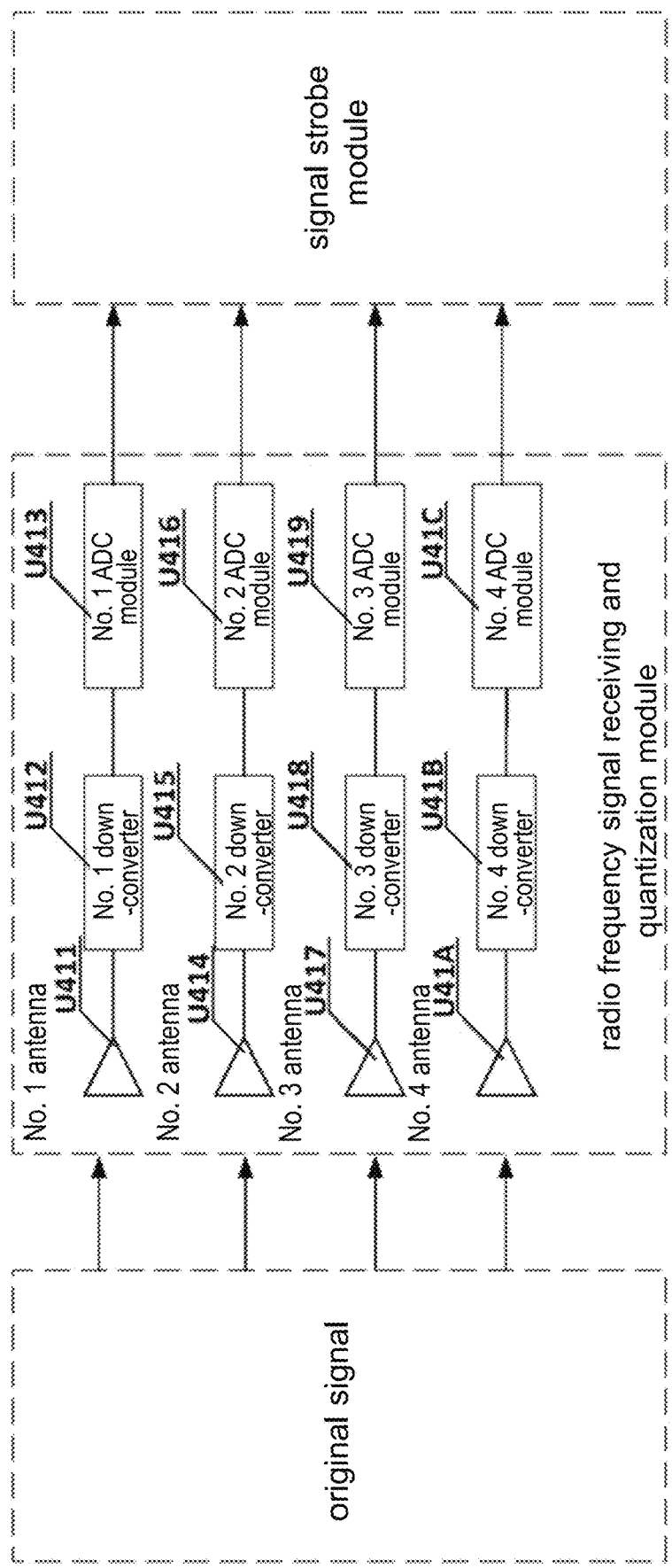
FIG. 3 is a schematic structural diagram of a radio frequency signal receiving and quantization module of a wireless channel simulator of a wireless channel monitoring and simulation device with MIMO according to an embodiment of the disclosure.

As shown in FIG. 3, the radio frequency signal receiving and quantization module U41 may process 4-path original signals. The 1-st path is taken as an example, which includes a No. 1 antenna U411, a No. 1 down-converter U412, and a No. 1 ADC module U413.

The No. 1 antenna U411 is configured to receive the original radio frequency signal of the 1-st path.

The No. 1 down-converter U412 is configured to remove a carrier wave of the original radio frequency signal, so as to obtain an intermediate frequency signal.

The No. 1 ADC module U413 performs analog-to-digital conversion processing on the intermediate frequency signal and converts the intermediate frequency signal into a digital baseband signal.

Figure 4:
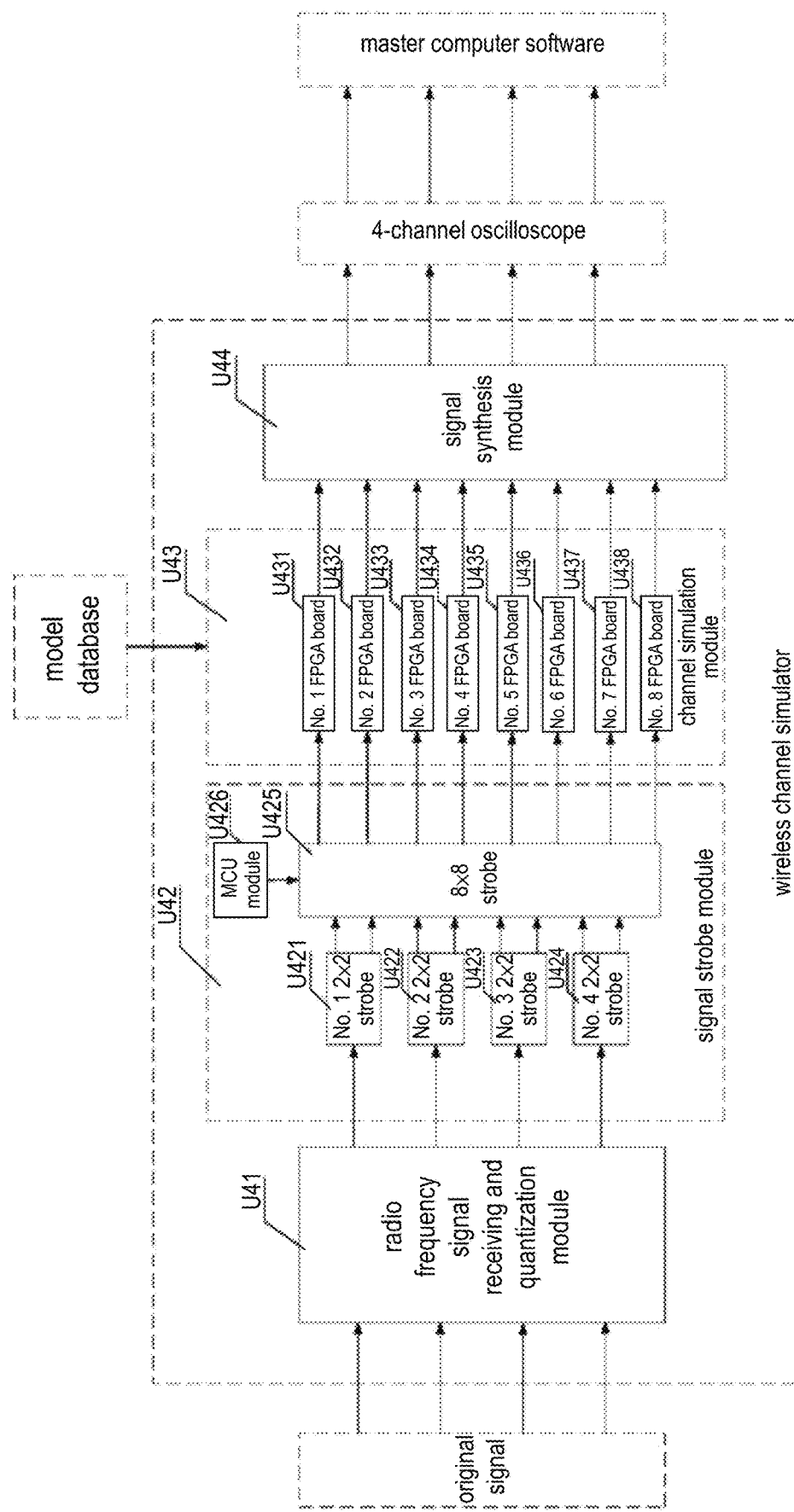
FIG. 4 is a schematic structural diagram of a wireless channel simulator of a wireless channel monitoring and simulation device with MIMO according to an embodiment of the disclosure.

As shown in FIG. 4, the signal strobe module U42 includes a No. 1 2×2 strobe U421, a No. 2 2×2 strobe U422, a No. 3 2×2 strobe U423, a No. 4 2×2 strobe U424, an 8×8 strobe U425, and an MCU module U426.

The No. 1 2×2 strobe U421, the No. 2 2×2 strobe U422, the No. 3 2×2 strobe U423, and the No. 4 2×2 strobe U424 all use only one input terminal. 2 output terminals may divide one-path input into identical 2-path outputs, so that 4-path inputs may be expanded into 8 paths, and the input of each path is expanded to 2 paths.

The input terminal of the 8×8 strobe U425 is connected to 8 outputs of the 4 2×2 strobes, and the output terminal has at most 8-path outputs. The output signal of each path is transmitted to the corresponding FPGA board in the channel simulation module U43 for processing.

The MCU module U426 is configured to control the on and off of the switch in the 8×8 strobe U425, so that each output terminal may output any one of the 8-path inputs according to requirements.

The channel simulation module U43 includes a No. 1 FPGA board U431, a No. 2 FPGA board U432, a No. 3 FPGA board U433, a No. 4 FPGA board U434, a No. 5 FPGA board U435, a No. 6 FPGA board U436, a No. 7 FPGA Board U437, and a No. 8 FPGA board U438. Parameters of each FPGA board are configured by the model database U2 to simulate a wireless channel. After the signal of each path is processed by the corresponding FPGA board, the signal is transmitted to the signal synthesis module U44.

Figure 5:
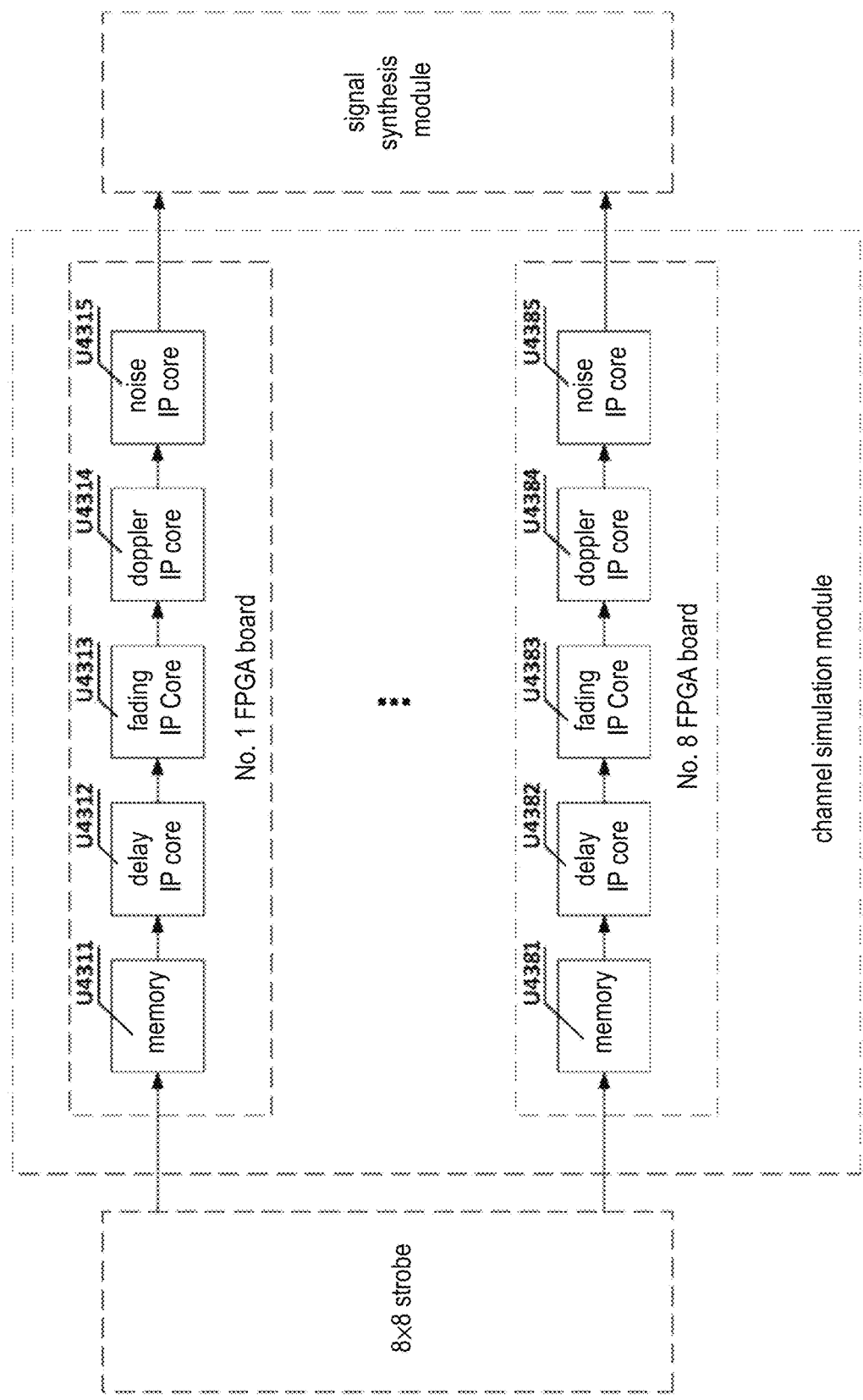
FIG. 5 is a schematic structural diagram of a field programmable gate array (FPGA) board of a channel simulation module of a wireless channel simulator according to an embodiment of the disclosure.

Referring to FIG. 5, the internal structures of the 8 FPGA boards in the channel simulation module U43 are all the same. Taking the No. 1 FPGA board U431 as an example, the No. 1 FPGA board U431 includes a memory U4311, a delay IP core U4312, a fading IP core U4313, a doppler IP core U4314, and a noise IP core U4315.

The memory U4311 is configured to store the input signal of the first path to adjust the time delay.

The delay IP core U4312 simulates the delay effect of the wireless channel on the signal according to a configured channel delay parameter.

The fading IP core U4313 simulates the attenuation effect of the wireless channel on the signal according to a configured channel attenuation parameter.

The doppler IP core U4314 simulates the doppler frequency shift effect of the wireless channel on the signal according to a configured channel doppler frequency shift parameter.

The noise IP core U4315 simulates the noise effect of the wireless channel on the signal according to a configured channel noise parameter.

It should be understood that persons skilled in the art may make improvements or changes based on the above descriptions, and all the improvements and changes should fall within the protection scope of the appended claims of the disclosure.

What is claimed is:

1. A wireless channel monitoring and simulation device with multi-input multi-output (MIMO), comprising: a wireless channel monitor, a model database, an original signal, a wireless channel simulator, an N-channel oscilloscope, and a master computer software, wherein
the wireless channel monitor is configured to collect characteristic parameters of wireless channels in a plurality of typical environments, establish characteristic parameter models based on the characteristic parameters of the wireless channels in the typical environments, and store the established characteristic parameter models in the model database;
the model database is configured to store the characteristic parameter models of the wireless channels in the typical environments and configure parameters of the wireless channel simulator;
the original signal is a signal to be simulated to pass through the wireless channel simulator and is a wireless radio frequency signal, wherein N-path inputs are adopted and N different original signals are simultaneously inputted;
the wireless channel simulator is configured to receive a parameter configuration of the model database and receive the original signal, wherein the wireless channel simulator configured by the model database simulates a typical channel environment for the original signal, so that the original signal is the same as that in a real typical channel environment, and the wireless channel simulator adopts N-path outputs;
the N-channel oscilloscope is configured to observe specific waveforms of N-path simulated signals outputted by the wireless channel simulator, and transmit the N-path outputs to the master computer software; and
the master computer software is configured to receive the N-path outputs from the wireless channel simulator, and process, analyze, and store N-path output signals.

2. The channel monitoring and simulation device with MIMO according to claim 1, wherein in the wireless channels in the typical environments, the typical environments comprise a strong electromagnetic environment, a storm environment, a plateau environment, and a high-speed railway operating environment.

3. The wireless channel monitoring and simulation device with MIMO according to claim 1, wherein the wireless channel simulator comprises a radio frequency signal receiving and quantization module, a signal strobe module, a channel simulation module, and a signal synthesis module, wherein
the radio frequency signal receiving and quantization module is configured to receive an original radio frequency signal, perform down-conversion and analog-to-digital conversion processing on the original radio frequency signal, and transmit a processed digital signal to the signal strobe module;
the signal strobe module is configured to gate N-path signals processed by the radio frequency signal receiving and quantization module to 2N paths, and transmit 2N-path signals to the channel simulation module;
the channel simulation module is configured to receive the 2N-path signals transmitted by the signal strobe module, and perform a channel simulation operation on a received signal of each path according to a configuration of the model database, wherein the channel simulation module simulates at most 2N different channels and transmits processed signals to the signal synthesis module; and
the signal synthesis module is configured to receive the 2N-path signals processed by the channel simulation module and superposition received signals to simulate a situation of simultaneous appearance of the typical environments or superposition of multi-path signals in one environment, wherein a superpositioned signal has N output channels.

4. The wireless channel monitoring and simulation device with MIMO according to claim 3, wherein the signal synthesis module receives the 2N-path signals processed by the channel simulation module, wherein if only one typical channel is simulated, there are $C_1^{2N}$ outputs; if superposition of two channels is simulated, there are $C_2^{2N}$ outputs; similarly, if superposition of 2N channels is simulated, there are $C_{2N}^{2N}$ outputs; and an output channel of each path outputs at most $C_1^{2N}+C_2^{2N}+\ldots+C_{2N}^{2N}$ original signal change situations.

5. The wireless channel monitoring and simulation device with MIMO according to claim 3, wherein the radio frequency signal receiving and quantization module comprises N signal receiving and quantization processing paths, wherein each path comprises an antenna, a down-converter, and an analog-to-digital converter (ADC) module, wherein
the antenna is configured to receive the original radio frequency signal;
the down-converter is configured to remove a carrier wave of the original radio frequency signal, so as to obtain an intermediate frequency signal; and
the ADC module is configured to perform analog-to-digital conversion processing on the intermediate frequency signal, and convert the intermediate frequency signal into a digital baseband signal.

6. The wireless channel monitoring and simulation device with MIMO according to claim 3, wherein the signal strobe module comprises N 2×2 strobes, a 2N×2N strobe, and an MCU module, wherein
the 2×2 strobe is configured to expand a 1-path digital baseband signal outputted by the radio frequency signal receiving and quantization module into two-path signals;
the 2N×2N strobe is configured to gate 2N outputs of the N 2×2 strobes to any one path in 2N-path outputs according to requirements; and
the MCU module is configured to control an on and off of an internal switch of the 2N×2N strobe, thereby controlling an output of the 2N×2N strobe.

7. The wireless channel monitoring and simulation device with MIMO according to claim 6, wherein the channel simulation module comprises 2N field programmable gate array (FPGA) boards, respectively connected to the 2N-path outputs of the 2N×2N strobe, wherein parameters of each FPGA board are configured by the model database to simulate a wireless channel, and a signal of each path is transmitted to the signal synthesis module after being processed by the corresponding FPGA board.

8. The wireless channel monitoring and simulation device with MIMO according to claim 7, wherein the FPGA board of the channel simulation module comprises a memory, a delay IP core, a fading IP core, a doppler IP core, and a noise IP core, wherein

- the memory is configured to store an input signal to adjust time delay;
- the delay IP core simulates a delay effect of the wireless channel on the signal according to a channel delay parameter configured by the model database;
- the fading IP core simulates an attenuation effect of the wireless channel on the signal according to a channel attenuation parameter configured by the model database;
- the doppler IP core simulates a doppler frequency shift effect of the wireless channel on the signal according to a channel doppler frequency shift parameter configured by the model database; and
- the noise IP core simulates a noise effect of the wireless channel on the signal according to a channel noise parameter configured by the model database.

9. The wireless channel monitoring and simulation device with MIMO according to claim 3, wherein in N-path input signals, N is an integer multiple of 4.

* * * * *